United States Patent
Van Swam et al.

(10) Patent No.: US 6,370,214 B1
(45) Date of Patent: Apr. 9, 2002

(54) RADIATION INDUCED GROWTH INDICATION APPARATUS FOR PRESSURIZED WATER REACTOR NUCLEAR FUEL ASSEMBLIES

(75) Inventors: Leonard F. P. Van Swam, Richland; Vincent Noel Gallacher, Kennewick, both of WA (US)

(73) Assignee: Framtome ANP Inc., Lynchburg, VA (US)

(*) Notice: Subject to any disclaimer, the term of this patent is extended or adjusted under 35 U.S.C. 154(b) by 0 days.

(21) Appl. No.: 09/349,309

(22) Filed: Jul. 8, 1999

(51) Int. Cl.$^7$ ................................................ G21C 3/18
(52) U.S. Cl. ................ 376/450; 376/225; 376/234; 376/285; 376/364; 376/412; 376/420; 376/445
(58) Field of Search ..................... 376/420, 412, 376/364, 445, 285, 225, 234, 450

(56) References Cited

U.S. PATENT DOCUMENTS

| | | | | |
|---|---|---|---|---|
| 2,969,674 A | * | 1/1961 | Ogle | 73/359 |
| 3,147,190 A | * | 9/1964 | Williams | 176/67 |
| 4,111,748 A | * | 9/1978 | Hayashi et al. | 176/68 |
| 4,678,924 A | * | 7/1987 | Loriot et al. | 29/407 |
| 4,684,504 A | * | 8/1987 | Wilson et al. | 376/447 |
| 4,703,648 A | | 11/1987 | Baresh | 73/104 |
| 4,777,011 A | | 10/1988 | Scharpenberg | 376/245 |
| 4,943,409 A | * | 7/1990 | Broadley | 376/212 |
| 4,986,959 A | * | 1/1991 | Sparrow et al. | 376/445 |
| 4,993,169 A | | 2/1991 | Foster | 33/783 |
| 5,490,190 A | * | 2/1996 | Hopkins et al. | 376/364 |

FOREIGN PATENT DOCUMENTS

| | | | | |
|---|---|---|---|---|
| AU | 0241487 | * | 9/1962 | |
| DE | 2034549 | * | 3/1972 | G21C/3/16 |
| EP | 0062694 A2 | * | 10/1981 | G21C/3/16 |
| EP | 0084480 A2 | * | 7/1983 | G21C/3/32 |
| JP | 1968-18508 | * | 8/1968 | |

OTHER PUBLICATIONS

European search report dated Oct. 18, 2000 to Eropean Patent application corresponding to present application (4pp).

* cited by examiner

*Primary Examiner*—Michael J. Carone
*Assistant Examiner*—John Richardson
(74) *Attorney, Agent, or Firm*—Kenyon & Kenyon

(57) ABSTRACT

Apparatus for the determination of radiation induced growth due to burnup of a nuclear reactor fuel assembly in a reactor core.

13 Claims, 4 Drawing Sheets

RADIATION INDUCED GROWTH INDICATION APPARATUS FOR PRESSURIZED WATER REACTOR NUCLEAR FUEL ASSEMBLIES

FIELD OF THE INVENTION

The present invention relates to nuclear fuel assemblies, and in particular to an apparatus for the determination of radiation induced growth of a nuclear fuel assembly in a nuclear reactor.

BACKGROUND OF THE INVENTION

Nuclear reactors need to be periodically maintained and inspected as well as refueled. Refueling operations involve the removal of the equipment and apparatus positioned in the reactor vessel above the reactor core which comprises nuclear fuel assemblies each of which contain nuclear fuel rods held or supported in parallel positions by spacers and an upper and a lower tie plate. The nuclear fuel assemblies are supported in the reactor core by a lower core support plate and extend upwards to an upper core support plate which serves to align the upper portion of the fuel assemblies which are positioned at their lower ends in predetermined positions in the lower core support plate so that the fuel assemblies are parallel to one another. The upper tie plate of the assemblies contain suppression springs to ensure that the assembly is firmly seated on the lower core support plate at all times.

The distance between the top of the solid portion of the upper tie plate along its span of a nuclear fuel assembly and the underside of the upper core support plate of the reactor determines the available room for radiation induced growth of the assembly due to reactor operations.

Current methods of determining nuclear fuel assembly length and growth, and assessing the available space for growth after the tie plate suppressions springs of the fuel assembly contact and are compressed a given amount against the underside of the upper core support plate require measurements and calculations which are complex and may lead to significant uncertainties. There aren't any known current means to measure the upper tie plate to core plate gap directly.

It would therefore be an advantage over the prior art designs to provide an apparatus for determining the gap between the upper tie plate and upper core support plate and therefore the determination of the fuel assembly growth resulting from radiation induced growth.

SUMMARY OF THE INVENTION

In accordance with one embodiment of the present invention, a radiation induced growth indication apparatus is provided for the determination of radiation induced growth of a pressurized water reactor nuclear fuel assembly positioned in a reactor core having an upper core support plate, the nuclear fuel assembly including an upper tie plate, comprising an inelastically compressible structural member disposed between the upper tie plate and upper core support plate and secured to a top of the upper tie plate and extending into contact with the upper core support plate for compression due to the movement of the fuel assembly against the upper core support plate as a result of radiation induced growth.

In accordance with another embodiment of the present invention, a radiation induced growth indication apparatus is provided for the determination of radiation induced growth of a pressurized water reactor nuclear fuel assembly positioned in a reactor core having an upper core support plate, the nuclear fuel assembly including an upper tie plate, comprising a rod disposed between the upper tie plate and upper core support plate and positioned at a proximate end in an aperture formed into a top of the upper tie plate and a distal end of the rod extending into contact with the upper core support plate for compressing the distal end further into the aperture due to the movement of the fuel assembly against the upper core support plate as a result of radiation induced growth.

DETAILED DESCRIPTION OF THE INVENTION

Figure 1:
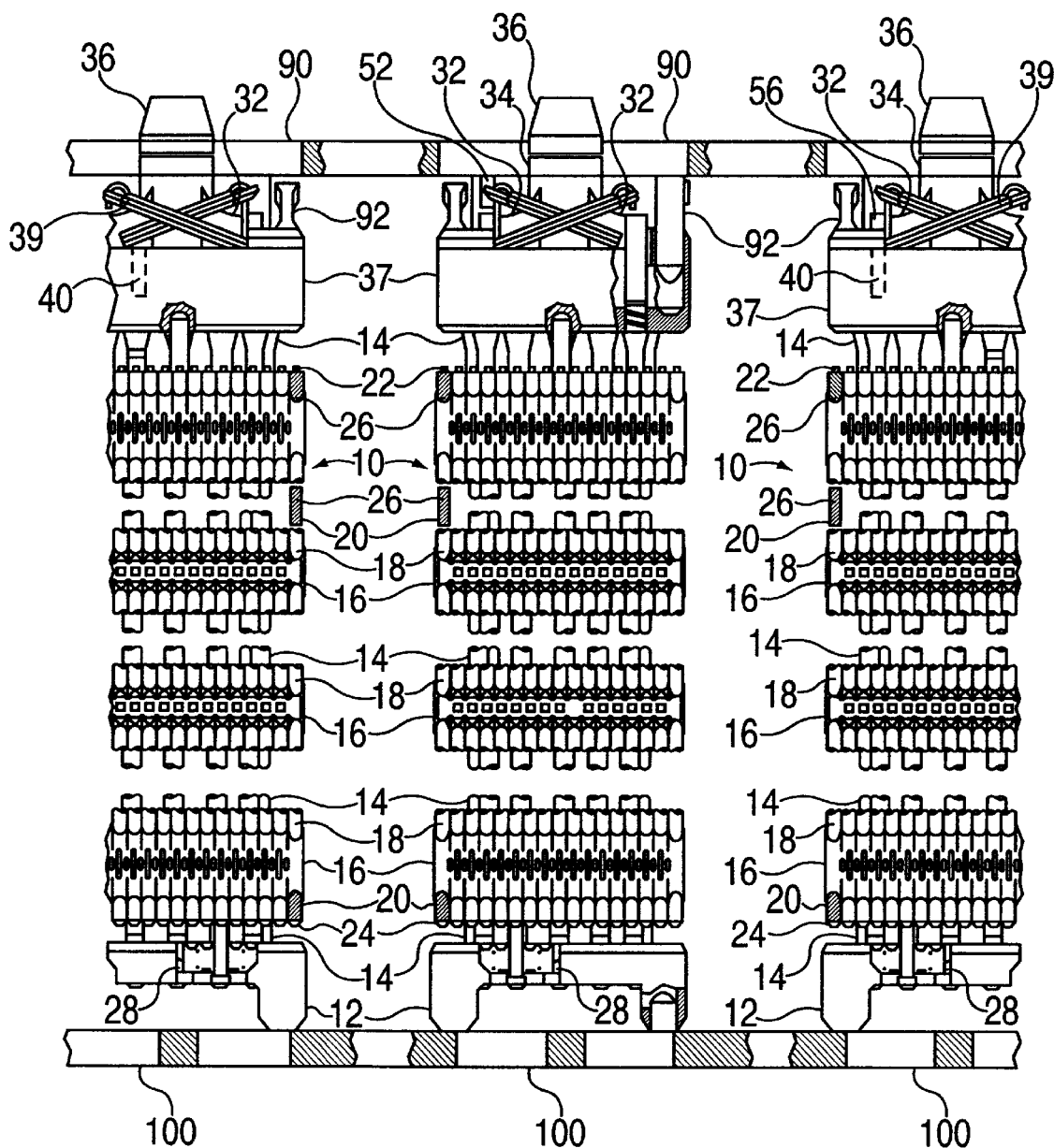
FIG. 1 represents a nuclear fuel assembly for a pressurized water reactor.

FIG. 1 represents a pressurized water reactor (PWR) nuclear fuel assembly 10 comprising a lower tie plate 12, guide tubes 14, spacer grids 16 spaced along the guide tubes, fuel rods 18 which are spaced radially and supported by spacer grid 16, instrumentation tube 28, an upper tie plate 37 attached to the upper ends of the guide tubes, and tie plate suppression springs 39. Each fuel rod 18 generally includes nuclear fuel pellets 20 composed of fissionable material, and upper end plug 22 and lower end plug 24 which seal the fuel rod. Plenum spring 26 maintains the position of the pellets within the fuel rod. Water as the coolant/moderator is pumped upwardly through the fuel assemblies thereby removing the heat generated by the fuel rods. Control rods 30 which are used to assist in controlling the fission reaction are shown disposed in guide tubes 14. Several control rods are grouped together and each control rod has a radial arm 32 which interconnect with one another at a central cylindrical member 34 to form a control rod cluster control mechanism 36 for vertically lowering and raising the control rods in the cluster into and out of the guide tubes, and hence into and out of the fuel assembly. The upper tie plate 37 of pressurized water reactor nuclear fuel assemblies is designed to allow alignment pins 92 of the upper core support plate 90 to be positioned into the alignment holes of the upper tie plate.

Figure 2:
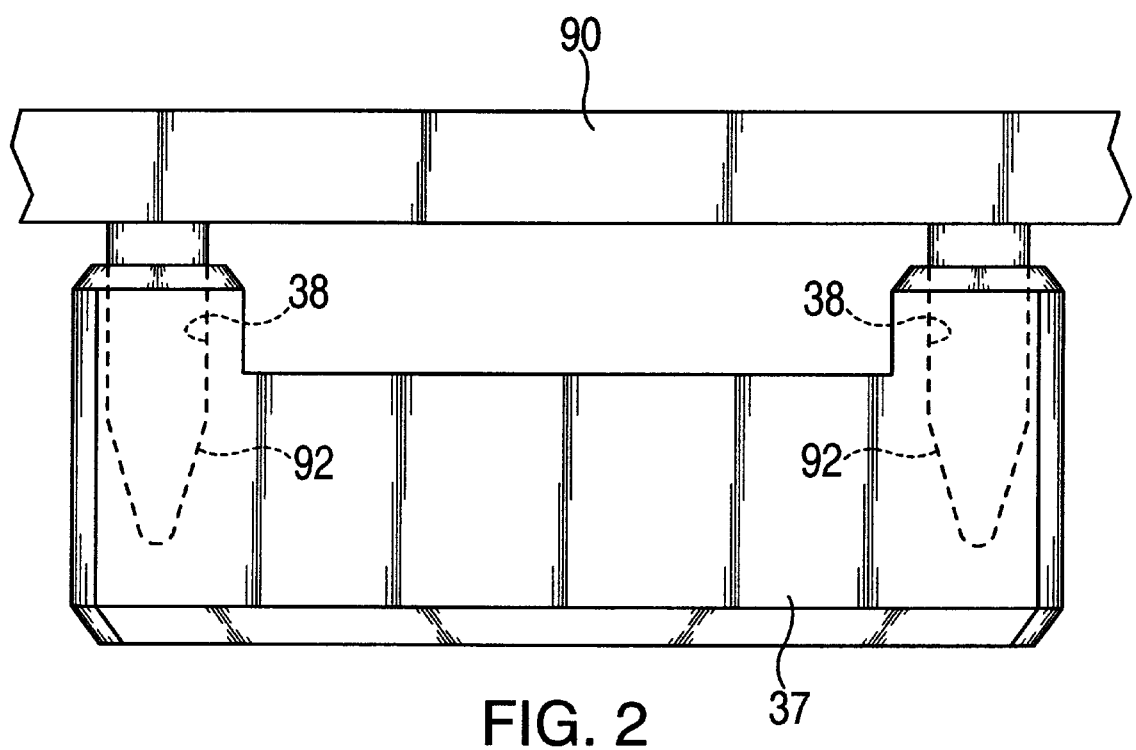
FIG. 2 is a schematic representation of an upper portion of a pressurized water reactor fuel assembly and the alignment pins of the upper core support plate positioned within the upper tie plate.

FIG. 2 schematically represents the upper portion of a typical PWR nuclear fuel assembly and shows upper tie plate 37 and upper core support plate 90 with the alignment pins 92 disposed through the alignment holes 38 in the upper tie plate with the tie plate suppression springs 39 removed for clarity of illustration.

In accordance with the present invention, a Radiation Induced Growth Indication Apparatus is provided in which a device is attached or secured on the top of the upper tie plate and disposed between the upper tie plate and upper core support plate and which when compressed, reduces in height relative to a known fuel assembly upper tie plate height dimension. The device would be compressed between the upper tie plate and the upper core support plate after the assembly has been placed in the core and the upper core support plate has been put in place as a result of radiation induced growth of the nuclear fuel assembly as well as by the differential thermal expansion between the fuel assembly and the surrounding reactor core structure. By providing a device which plastically deforms, or is inelastically compressed by a force, the fuel assembly upper tie plate to upper core plate gap available for expansion of the assembly can be determined at the end of a fuel cycle by a measuring tool to measure the compressed height of the device.

In accordance with one embodiment of the present invention, a thin walled or hollow tube is secured to a location of the upper tie plate of the fuel assembly where it can interact with the reactor upper core support plate and which progressively collapses with a decrease of the upper tie plate to upper core plate gap due to thermal expansion and/or radiation induced growth of the fuel assembly. The tube compresses with a relatively moderate force (e.g. 10 pounds or less) and will maintain a plastically deformed shape when the upper core support plate is removed for refueling or other maintenance of the core. The tube could contain a honeycomb pattern of holes through its circumference and extending along its length.

In a second embodiment, a rod or roll-type pin is press fit into a hole in the upper surface of the fuel assembly upper tie plate. The height of the rod or pin is selected such as to also contact the underside of the upper core support plate when the fuel assembly is installed in the reactor. As the fuel assembly is irradiation and radiation induced growth occurs, the pin is pressed further into the hole which is predrilled to a depth sufficient to allow pin compression to the full growth potential of the nuclear fuel assembly.

Figure 3:
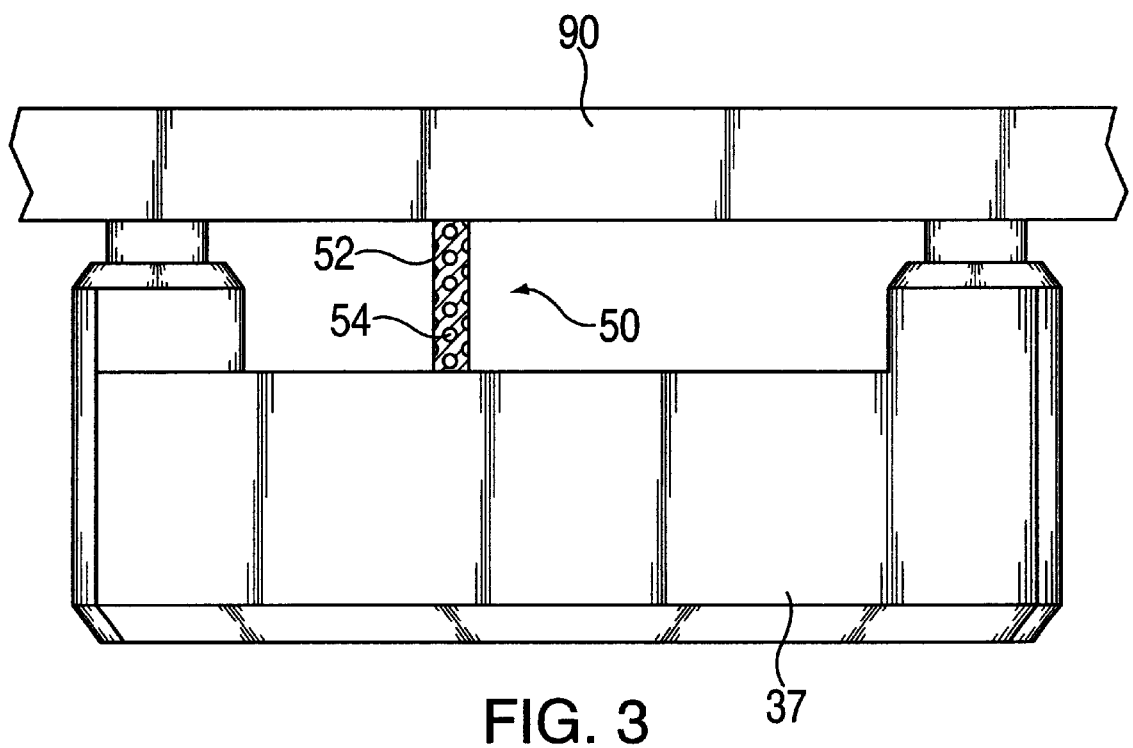
FIG. 3 is a schematic representation of the upper portion of a fuel assembly and the upper core support plate in FIG. 1, showing an embodiment of the Radiation Induced Growth Indication Apparatus for pressurized water reactor nuclear fuel assemblies.

Referring to FIG. 3, the Radiation Induced Growth Indication Apparatus 50 comprises a tube 52 positioned between the upper tie plate 37 of the fuel assembly and the upper core support plate 90 (also shown in FIG. 1). Tube 52 can include apertures 54 extending through the wall of the tube at any axial and/or radial position along its circumference.

Figure 4:
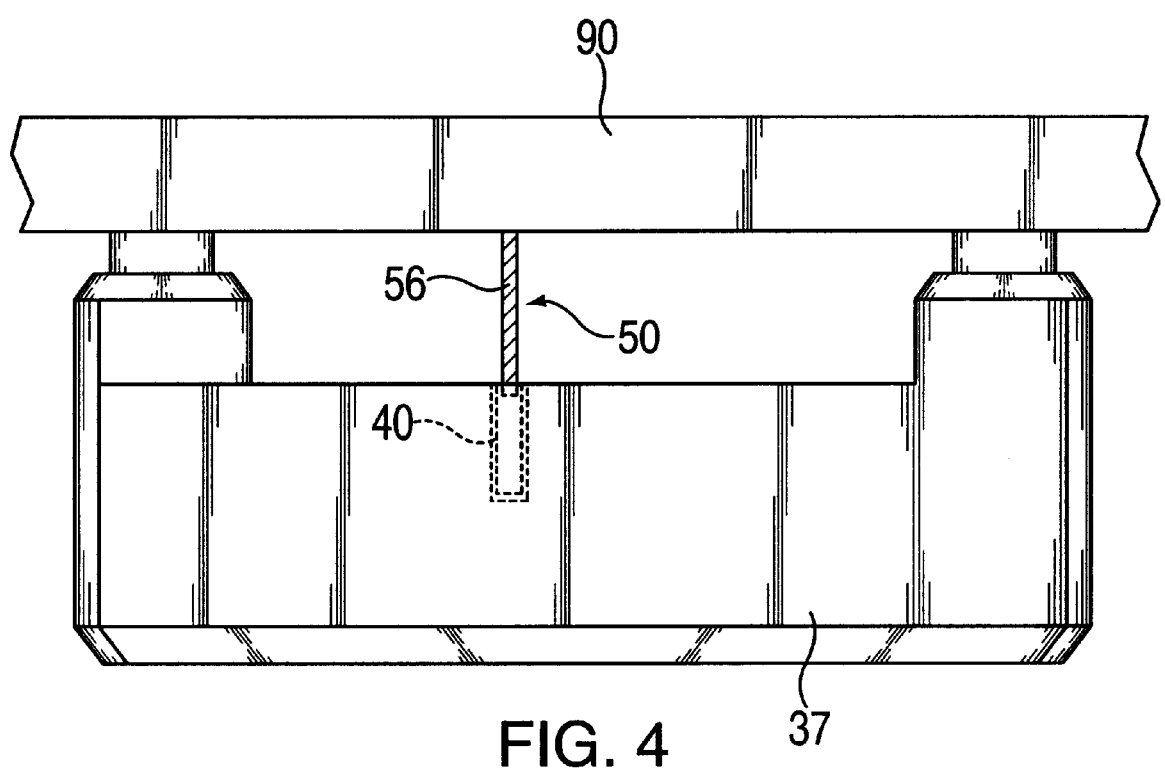
FIG. 4 is a schematic representation of the upper portion of a fuel assembly and the upper core support plate in FIG. 1, showing another embodiment of the Radiation Induced Growth Indication Apparatus for pressurized water reactor nuclear fuel assemblies.

In a second embodiment of the present invention, the Radiation Induced Growth Indication Apparatus 50 which is depicted in FIG. 4 (and also shown in FIG. 1) comprises a rod or roll type pin 56 which is press fit into a hole 40 in upper tie plate 37. As shown in FIG. 3, the height of rod or pin 56 is selected to contact the underside of upper core support plate 90 when the fuel assembly is installed in the reactor. As the fuel assembly is irradiated, the pin or rod 56 is pressed further into hole 40.

For a typical nuclear reactor, the Radiation Induced Growth Indication Apparatus requires about one inch, and more typically 0.8 inch of compressible range to provide indication of the upper tie plate to upper core plate gap over the lifetime of the fuel assembly. The compressed height of the device is measured by a depth micrometer or any other similar tool which may be modified as and if necessary for fuel inspection purposes as is known in the art.

The present invention provides an accurate assessment of the available nuclear fuel assembly to upper core support plate distance as a function of fuel burnup or exposure for determining the remaining fuel assembly to upper core support plate distance so as to enable a determination of useable fuel assembly life or usage.

While the present invention has been particularly shown and described with reference to preferred embodiments thereof, it will be understood by those skilled in the art that various changes in form and details may be made therein without departing from the spirit and scope of the invention.

What is claimed:

1. A radiation induced growth indication apparatus for the determination of radiation induced growth of a pressurized water reactor nuclear fuel assembly positioned in a reactor core having an upper core support plate, the nuclear fuel assembly including an upper tie plate, said apparatus comprising:

an inelastically compressible structural member configured to be disposed between and to be in contact with the upper tie plate and upper core support plate, wherein said compressible structural member is configured to be compressed due to a movement of the upper tie plate relative to the upper core support plate as a result of radiation induced growth of the fuel assembly.

2. The radiation induced growth indication apparatus as in claim 1 wherein the inelastically compressible structural member is a hollow tube.

3. The radiation induced growth indication apparatus as in claim 2 wherein the hollow tube compresses in response to the application of a compressible force of 10 pounds or less.

4. The radiation induced growth indication apparatus as in claim 3 wherein the hollow tube has a circumference and further comprises a plurality of holes through the circumference.

5. The radiation induced growth indication apparatus as in claim 2 wherein the inelastically compressible structural member is a rod.

6. The radiation induced growth indication apparatus as in claim 5 wherein the rod is positioned at one end into an aperture in an upper surface of the fuel assembly upper tie plate.

7. The radiation induced growth indication apparatus as in claim 6 wherein the rod compresses in response to the application of a compressive force of 10 pounds or less.

8. A radiation induced growth indication apparatus for the determination of radiation induced growth of a pressurized water reactor nuclear fuel assembly positioned in a reactor core having an upper core support plate, the nuclear fuel assembly including an upper tie plate, comprising a rod disposed between the upper tie plate and upper core support plate and positioned at a proximate end in an aperture formed into a top of the upper tie plate and a distal end of the rod extending into contact with the upper core support plate for compressing the distal end further into the aperture due to the movement of the fuel assembly against the upper core support plate as a result of radiation induced growth.

9. The radiation induced growth indication apparatus as in claim 8 wherein the aperture in the top of the upper tie plate extends into the upper tie plate a predetermined depth to allow the rod to be pressed into the aperture a distance corresponding to the movement of the fuel assembly toward the upper core support plate as a result of radiation induced growth.

10. A system comprising:

a reactor core having an upper core support plate;

a pressurized water reactor nuclear fuel assembly positioned in said reactor core and having an upper tie plate; and an inelastically compressible structural member disposed between and in contact with the upper tie plate and upper core support plate, wherein said compressible structural member is configured to be compressed due to a movement of the upper tie plate relative to the upper core support plate as a result of radiation-induced growth of the fuel assembly.

11. The system as in claim 10 wherein the inelastically compressible structural member is a hollow tube.

12. The system as in claim 2 wherein the hollow tube compresses in response to the application of a compressible force of 10 pounds or less.

13. The system as in claim 3 wherein the hollow tube has a circumference and further comprises a plurality of holes through the circumference.

\* \* \* \* \*

UNITED STATES PATENT AND TRADEMARK OFFICE
CERTIFICATE OF CORRECTION

PATENT NO. : 6,370,214 B1
DATED : April 9, 2002
INVENTOR(S) : Leonard F.P. Van Swam and Vincent Noel Gallacher It is certified that error appears in the above-identified patent and that said Letters Patent is hereby corrected as shown below:

Column 1,
Line 37, change "suppressions" to -- suppression --;

Column 3,
Line 35, change "assembly is irradiation" to -- assembly is irradiated --;

Column 4,
Line 27, change "compressible" to -- compressive --;
Line 34, change "claim 2" to -- claim 1 --;

Column 6,
Line 2, change "compressible" to -- compressive --.

Signed and Sealed this

First Day of April, 2003

JAMES E. ROGAN
*Director of the United States Patent and Trademark Office*